Dec. 21, 1965 M. S. RUNDEL 3,225,278
GENERATOR-FED HOIST MOTOR CONTROL WITH LOAD FLOAT CONTROL
Filed April 7, 1958 8 Sheets-Sheet 1

Dec. 21, 1965 M. S. RUNDEL 3,225,278
GENERATOR-FED HOIST MOTOR CONTROL WITH LOAD FLOAT CONTROL
Filed April 7, 1958 8 Sheets-Sheet 4

Dec. 21, 1965  M. S. RUNDEL  3,225,278
GENERATOR-FED HOIST MOTOR CONTROL WITH LOAD FLOAT CONTROL
Filed April 7, 1958  8 Sheets-Sheet 6

Dec. 21, 1965  M. S. RUNDEL  3,225,278
GENERATOR-FED HOIST MOTOR CONTROL WITH LOAD FLOAT CONTROL
Filed April 7, 1958  8 Sheets-Sheet 8

INVENTOR.
MORTON S. RUNDEL
BY
Bruce & Brosler
HIS ATTORNEYS

United States Patent Office 3,225,278
Patented Dec. 21, 1965

3,225,278
GENERATOR-FED HOIST MOTOR CONTROL
WITH LOAD FLOAT CONTROL
Morton S. Rundel, Menlo Park, Calif., assignor, by mesne assignments, to Pacific Coast Engineering Company, Alameda, Calif., a corporation of California
Filed Apr. 7, 1958, Ser. No. 726,824
3 Claims. (Cl. 318—145)

My invention relates to hoists and more particularly to a load control for hoists. Specifically, the present invention constitutes an improvement in the hoist system of the pending application of Zweifel et al. for Multi-Range Hoist System, Serial No. 616,274, filed October 16, 1965, now Patent No. 3,078,406.

In such system as well as in hoist systems in general, control of the load is usual by increments of speed change induced by the cutting in or out of resistors in a speed control circuit, and when zero speed is desired, the hoist motor is disconnected and a brake applied to hold the load.

In many instances, however, the lifting or lowering of a load may call for very delicate control of the load travel whereby, for example, the load may be caused to move up or down from a standstill position, or reversed as to its direction of travel, in a slow, deliberate and continuous manner as if the load were floating in air. The present invention contemplates this through control of the hoist motor.

Accordingly, among the objects of my invention are:
(1) To provide a novel and improved control for a motor for obtaining a change in movement of a load in a slow, deliberate and continuous manner;
(2) To provide a novel and improved hoist motor control for obtaining a change in movement of a hoist load in a slow, deliberate and continuous manner;
(3) To provide a novel and improved hoist motor control which will enable a load to be held stationary without disconnecting power from the motor or resorting to brakes;
(4) To provide a novel and improved hoist motor control for enabling a load to, in effect, float in air.

Additional objects of my invention will be brought out in the following description of the same in its preferred form, taken in conjunction with the accompanying drawings wherein.

Figure 1:
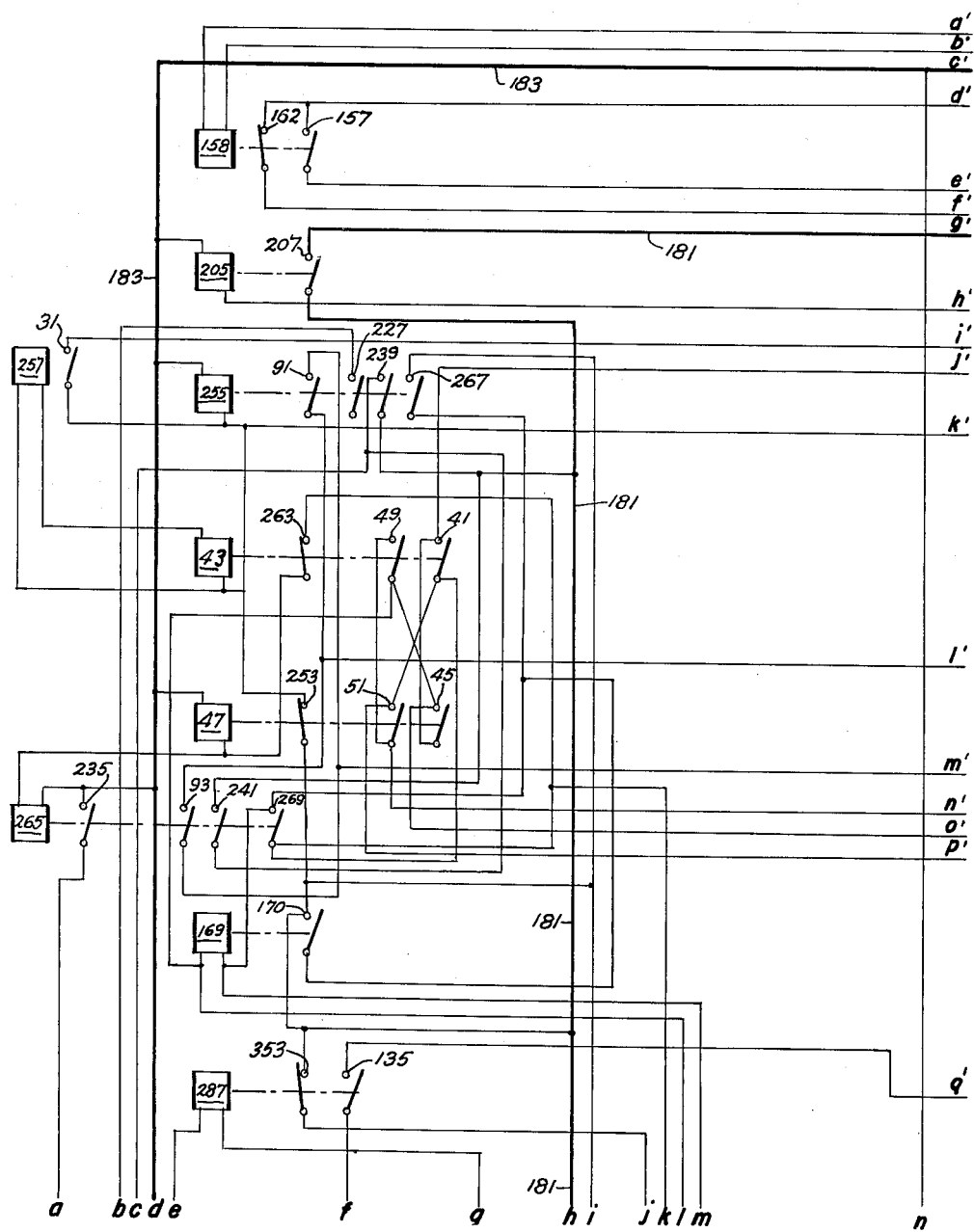
FIGURES 1 through 6 are complementary portions of a multi-range hoist system into which the present load float control has been incorporated.
Figure 2:
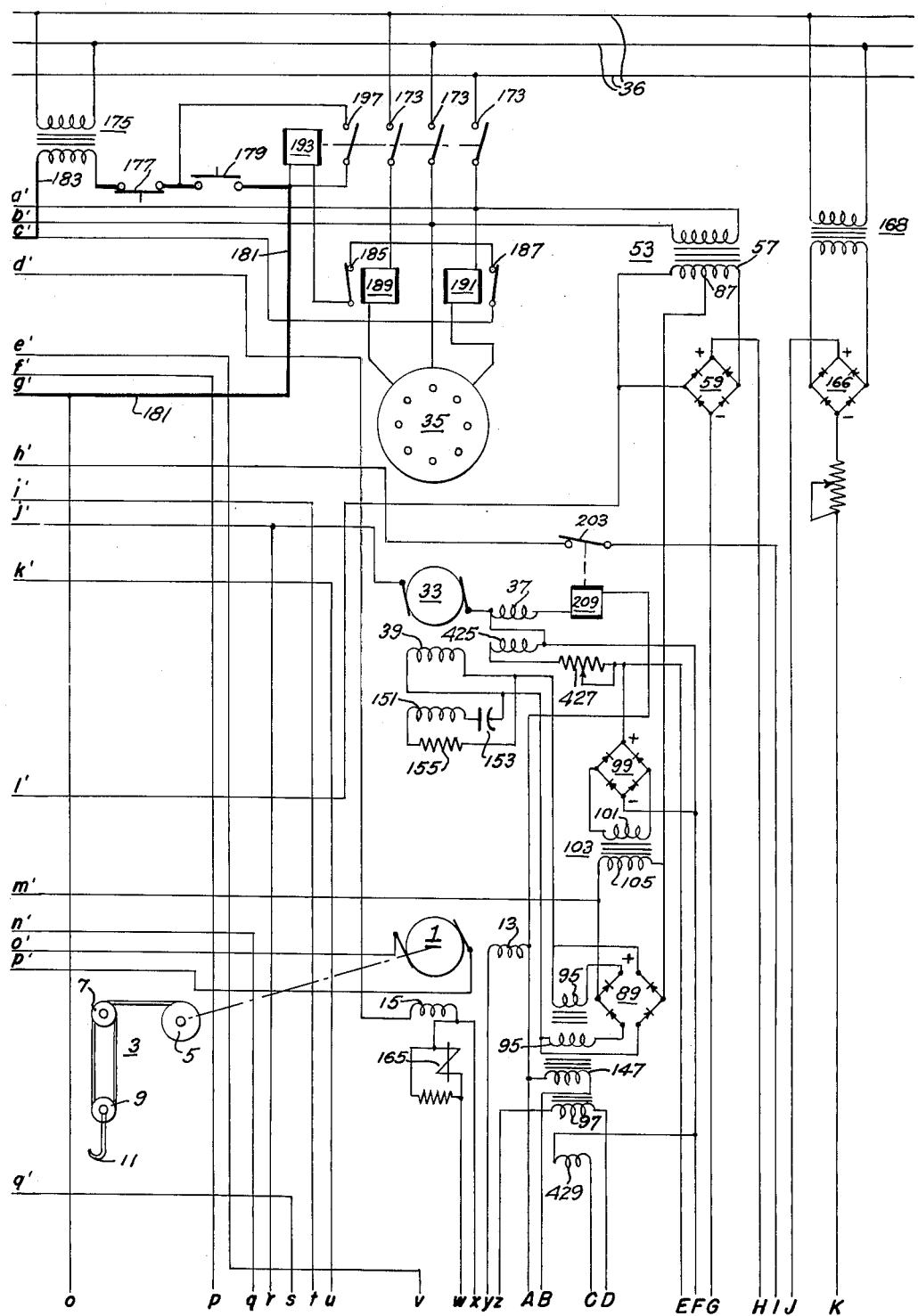
Figure 3:
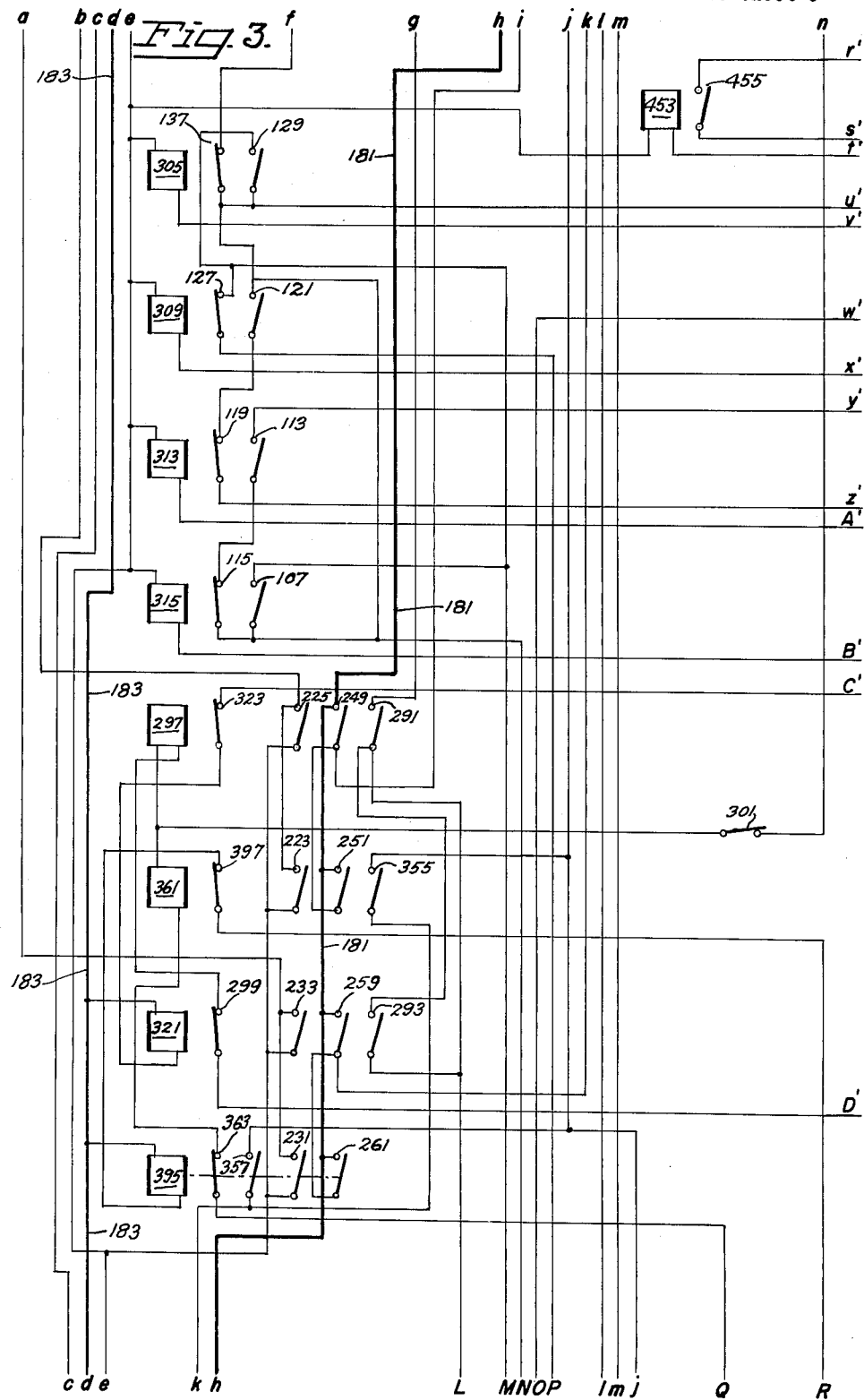
Figure 4:
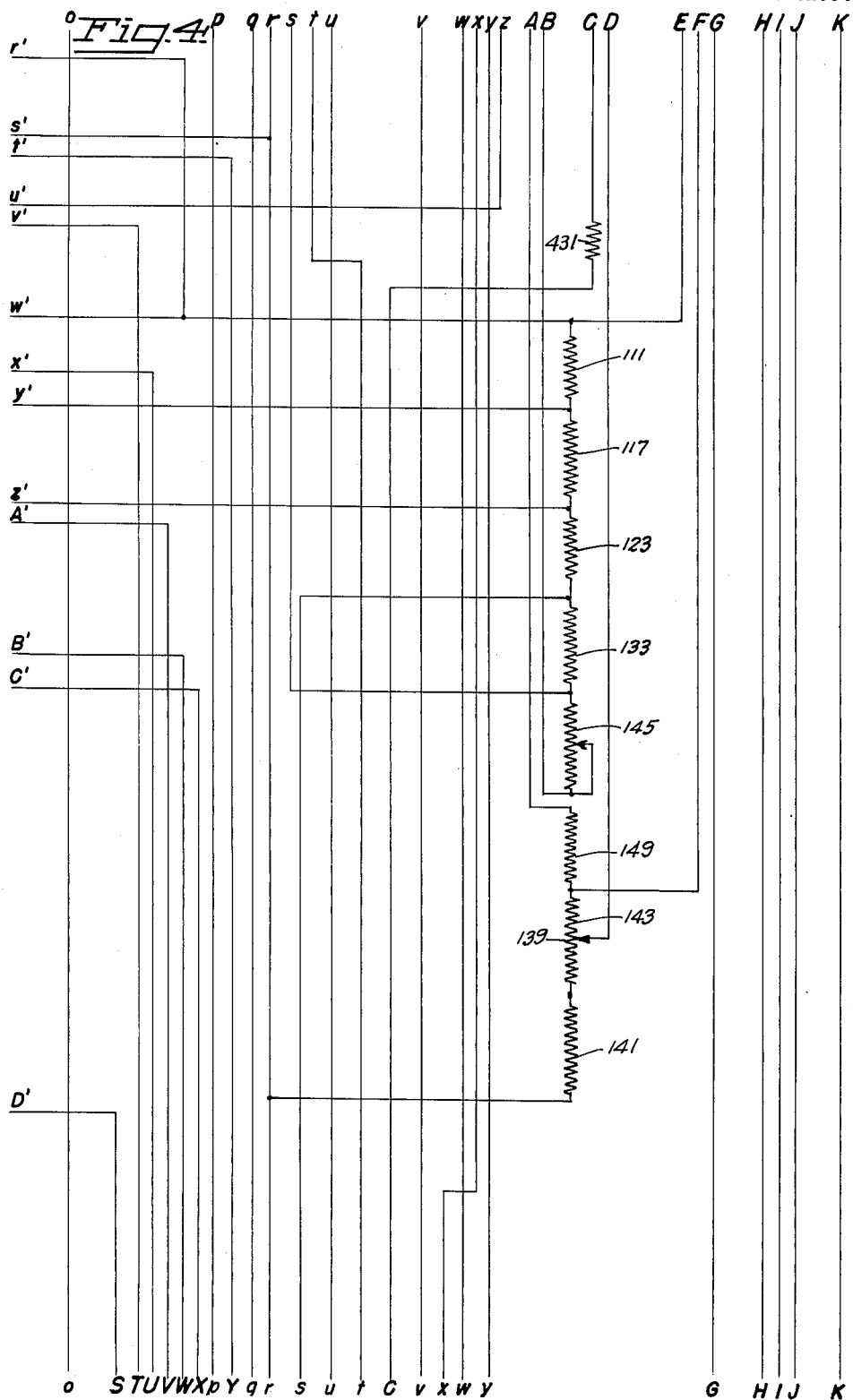
Figure 5:
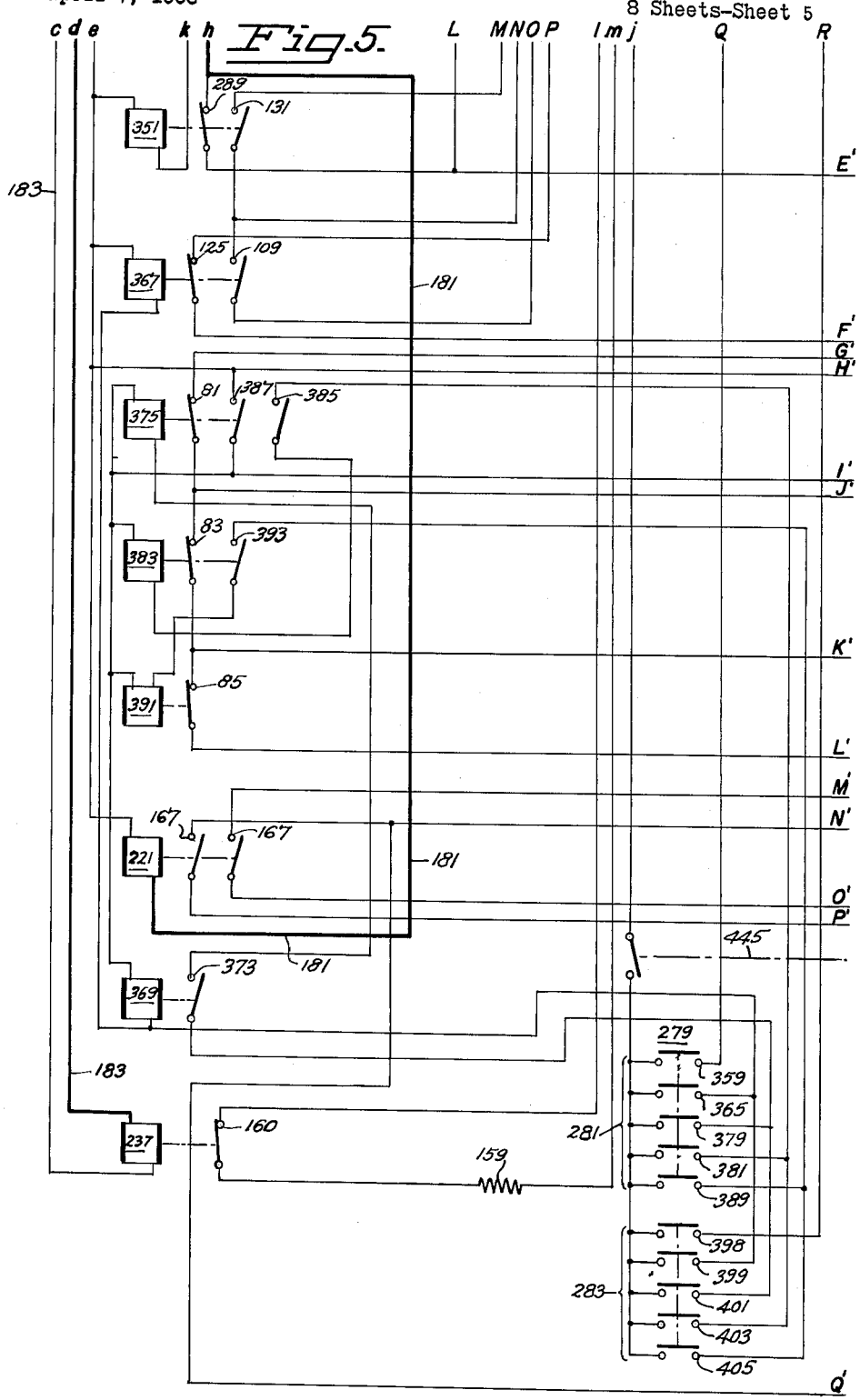
Figure 6:
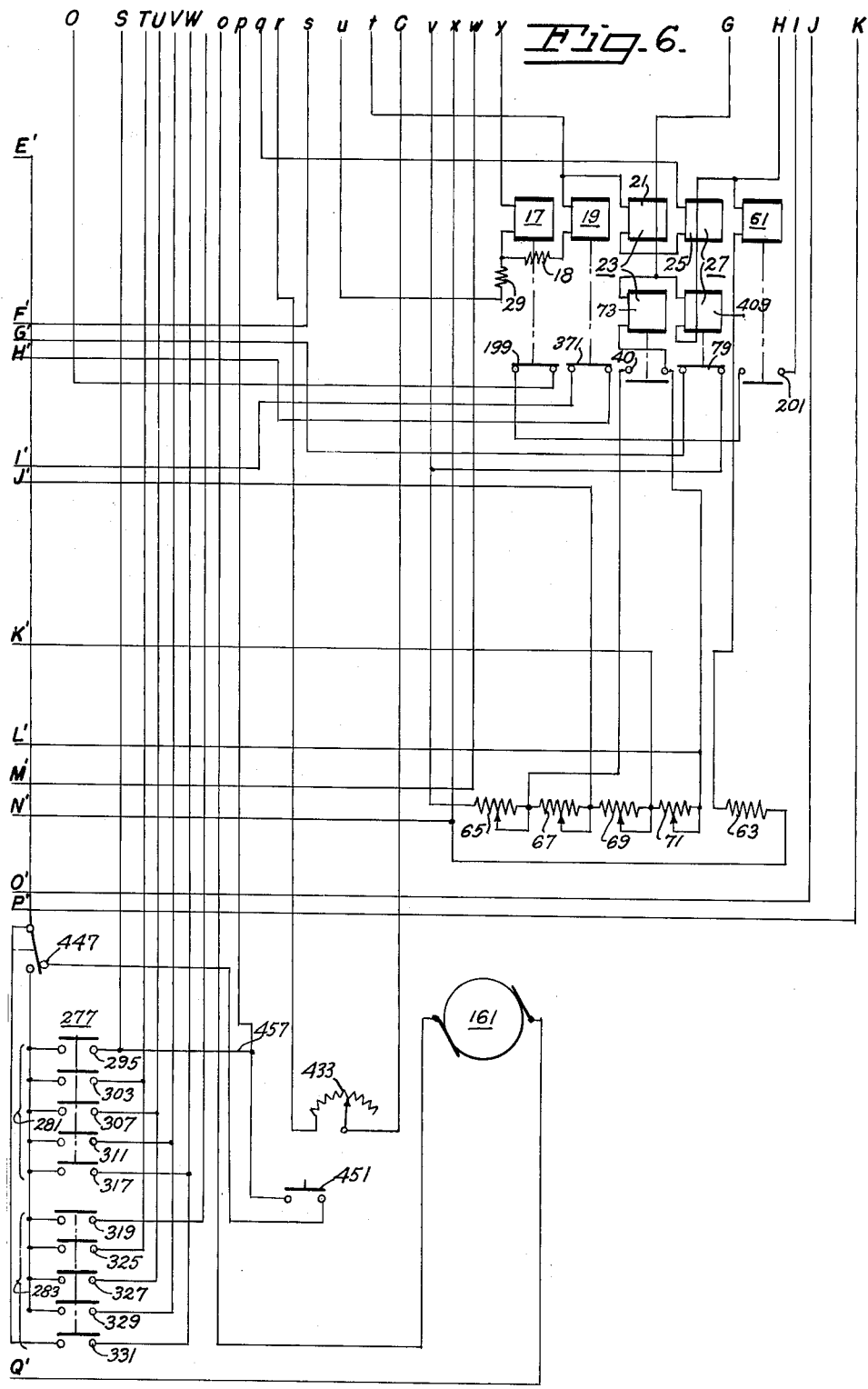

Referring to the drawings of such system, loads are lifted and lowered by means of a motor 1 operating through conventional type hoist mechanism 3 which may involve a cable drum 5, suitable sheaves 7, 9 . . . etc., which in turn support a load hook 11. The load motor and hoist mechanism are designed to handle the maximum load with the motor operating at base speed and below, and with the motor capable of functioning at higher speeds for lighter loads. Base speed is defined as the speed of the motor when rated armature and field voltage are applied.

The load motor is of the direct current type and is provided with a series field winding 13 and a separately excited field winding 15, the circuit of the series field winding including a heavy load current sensitive relay 17, a series resistor 18, a light load current sensitive relay 19, one winding 21 of a dual winding relay 23, and one winding 25 of a second dual winding relay 27. The series resistor 18 and relay 19 are adapted to be shunted by a resistor 29 through a pair of normally open contacts 31.

Armature voltage to the motor is derived from the output of a direct current generator 33 whose armature is mechanically driven by an alternating current drive motor 35 adapted for operation from a three phase power line 36. The generator like the load motor, is provided with a series field 37 and a separately excited field 39.

One side of the generator is connectable through the generator series field circuit, the motor series field circuit, including the relay 17, resistor 18, relay 19, and relay windings 21 and 25, to one brush of the motor armature through a normally open pair of contacts 49 on the relay 43, and to the other brush through another normally open pair of contacts 51 on the relay 47. The other side of the generator is connectable directly to one brush of the motor through a normally open pair of contacts 41 of a relay 43, and to the opposite brush of the motor through a normally open pair of contacts 51 on the relay 47.

The two pairs of contacts of each relay being associated with opposite brushes of the motor, the energization of one of the relays such as relay 43 will determine rotation of the motor in one direction, such as in the direction of lift, while the energization of the other relay will reverse the direction of rotation for lowering a load.

Direct current excitation to the separately excited motor field 15 is derived from one phase of the three phase power line 36, as by means of a step down transformer 53 when the line voltage is higher than desired for obtaining field excitation. The transformer secondary 57 is connected across two corners of a full wave rectifier 59, the other two corners being connected to the separately excited field circuit which includes a current sensitive relay 61, a field resistor 63, the field winding 15, normally open contacts 157, a series of adjustable field resistors 65, 67, 69 and 71, and the second winding 73 of the dual winding relay 23.

Each of the field resistors 65, 67, 69 and 71, is shunted by a pair of normally closed relay contacts 79, 81, 83, and 85 respectively. With all of resistors 67 through 71 shunted out, and with rated voltage applied to the armature of the motor, the motor is designed to function at base speed. By weakening the field of the motor, as by cutting in one or more of the resistors, the speed of the motor may be increased above its base speed.

Direct current excitation to the separately excited generator field 39 is also derived through the step-down transformer 53 in this instance from a lower voltage point 87 on the secondary of such transformer, the output of which is rectified through a full wave rectifier 89 and applied to the generator field through the closing of either of two pairs of normally open contacts 91 and 93.

In each lead to the separately excited field winding of the generator is a power winding 95, such windings constituting components of a magnetic amplifier for controlling the voltage generated by the generator for application to the armature of the motor. For generating the rated voltage of the generator, these power windings are operated at about saturation whereby the impedance is at a minimum and excitation of the generator field is at a maximum.

The function of a magnetic amplifier is to provide means for increasing the impedance of these windings to thereby decrease the field excitation and correspondingly decrease the voltage generated and applied to the armature of the load motor. In this manner, the speed of the motor can be decreased from its base speed to a small fractional value thereof.

Such a magnetic amplifier includes the aforementioned power windings and a control winding 97 mounted on a common core of magnetic material, the control winding being connected across a source of variable voltage to alter the current flow through the control winding and to thereby adjust the flux concentration in the common core within a desired range up to a condition of saturation.

The variable voltage source for the control winding involves a full wave rectifier 99 connected across the secondary 101 of a step-down transformer 103, the primary 105 of which like the separately excited generator field circuit, is connectable through the normally open contacts 91 or 93 to the secondary of the step-down transformer 53.

The control winding rectifier 99 is selectably connectable directly to the control winding through either of two normally open pairs of contacts 107 or 109; or to the control winding through a resistor 111, a pair of normally open contacts 113 and a pair of normally closed contacts 115; or it may be connected through resistor 111, a resistor 117 in series therewith, a pair of normally closed contacts 119 and a pair of normally open contacts 121; or a connection may be established through resistors 111, 117, a resistor 123, a pair of normally closed contacts 125, a second pair of normally closed contacts 127 and either of two parallel connected pairs of normally open contacts 129 or 131; or finally a connection may be established through resistors 111, 117, 123, a resistor 133 in series therewith, a normally open pair of contacts 135 and a normally closed pair of contacts 137.

It will be noted that the control winding adjustably taps into one of a pair of resistors 139, 141 connected in series across the generator armature, to thereby include a portion 143 of such resistors in the control winding circuit. Across this resistor, accordingly, there will be developed a voltage drop due to flow of current therethrough from the generator, and such voltage drop will be in a direction to oppose or buck the voltage drop developed across the selected resistors in the control winding circuit. This opposing voltage serves to limit the maximum to which the voltage across the control winding may rise.

A minimum reference voltage adjustment for the control winding 97 is determined by a resistor 145 completing a circuit from the resistor 133 to the bucking voltage resistor 139 through the generator series field winding 37.

By reason of the presence of the foregoing circuit, the control winding is also connectable in circuit with the generator 33 through the various relay contacts controlling the inclusion or disconnection of resistors 111, 117, 123 and 133, the voltage applied to this circuit being equal to the drop across resistor section 143. As these resistors are shunted out of the rectifier circuit to the control winding, they are added to the generator circuit to the control winding.

Thus with all of said resistors out of the rectifier circuit to the control winding, the generator circuit becomes relatively ineffective and the rectifier 99 predominates and causes substantial saturation of the core, whereby the magnetic amplifier impedance becomes a minimum and the generator field receives maximum excitation.

As the aforementioned resistors are added to the rectifier circuit, this circuit decreased in effectiveness while that of the generator increases, ultimately causing a reversal of current in the control winding and the creation of negative ampere turns on the magnetic amplifier, with a resulting decrease in generator field excitation and generator voltage.

Across the generator series field winding 37 is a compensating winding 147 and resistor 149. This compensating winding is located on the core of the magnetic amplifier, and will react to voltage changes across the series field winding 37 to prevent motor speed from dropping as the load on the hoist motor increases. In the absence of this winding, an increase in load on the motor would increase the voltage drop in the generator series field winding thereby reducing the voltage applied to the motor armature, with a resulting lowering of speed of the motor.

To further stabilize operation of the motor, insofar as it may be effected by erratic functioning of the generator, the generator separately excited field winding 39 is shunted by a circuit including an anti-hunt winding 151 in series with a condenser 153, and a resistor 155, such shunt circuit acting as a damper to sudden changes in the field voltage, to thereby prevent the amplifier from hunting.

The separately excited field winding circuit of the motor 1 is normally open by the inclusion of a pair of normally open contacts 157 associated with a relay 158 connected across one phase of the power lines and adapted to be closed upon energization of such relay.

Dynamic braking is provided for by a resistor 159 connected through a pair of normally closed contacts 160 across the motor armature. Thus under conditions where the armature is rotating in the absence of applied voltage, or as may happen in the case of a hoist, a load on being lowered, might overhaul and drive the motor, the motor will function as a generator. The resistor 159 will then act as a braking load on the motor.

In conjunction with such dynamic braking, there is mechanically coupled to and driven by the hoist motor, a permanent magnet type generator 161, the output of which is connected across the separately excited field winding 15 of the motor through a pair of normally closed contacts 162 which are also associated with the last mentioned relay. These normally closed contacts are therefore adapted to be opened upon energization of such relay, and such opening contacts will occur simultaneously with the closing of the contacts which places the field winding in circuit with its associated rectifier network for normal excitation.

Thus in the event of power failure, or in the event the main source of power is otherwise removed, the resulting de-energization of the relay 158 will open the field circuit of the motor and apply excitation from the permanent magnet type generator in a direction to enhance the dynamic braking.

The hoist motor will further be equipped with a solenoid releasable spring actuated mechanical brake 165 which, in the absence of power to energize the solenoid and overcome the effect of the spring, will brake the motor. The solenoid component of such brake is connectable to the output of a rectifier 166 of the full wave type, through a pair of normally open contacts 167 in each lead from such solenoid. This particular full wave rectifier is permanently connected to one phase of the alternating current power supply preferably through a transformer 168 of the step-down type. Such brake will assist the dynamic braking, but failure of such brake will merely result in increased dynamic braking due to the increased speed of the motor resulting from such failure.

As an added protection, an anti-plugging relay 169 is connected across the motor armature, and controls a pair of normally open contacts 170. The relay is such as releases its contacts when the voltage impressed thereon drops to a predetermined value, whereby the relay can hold a circuit until such lower voltage is reached.

As thus far described, hoist loads are handled by a direct current motor whose armature voltage is derived from a direct current generator, which in turn is mechanically driven by a three phase drive motor energized from a three phase alternating current line. Through generator voltage control as obtainable with a magnetic amplifier, the speed of the motor is capable of being varied from its base speed down to approximately 8% of its base speed, while by means of field weakening as obtainable by sequential inclusion of resistors in the separately excited field circuit of the motor, the speed of the motor is capable of being increased upwardly from its base speed to a value of the order of 400% base speed. Such maximum speed may be optionally controlled by the degree to which the field is permitted to be weakened.

The foregoing equipment constitutes the power side of the hoist system of the present invention, as distinguished from the control systems. The circuits involved are normally disconnected from the main power lines by normally open relay contacts 173.

Power for the control circuits is obtained through a step-down transformer 175 from a single phase of the main power lines. A start-stop switch arrangement in one of the leads from this transformer and involving a normally closed stop switch 177 and a normally open start switch 179 determines when power is made available to the control circuits, which are supplied from a pair of leads 181 and 183.

Connected between the control power leads, through two pairs of normally closed contacts 185 and 187 associated with overload relays 189 and 191 respectively, in the lines to the alternating current motor 35, is a motor starting relay 193, which is adapted to be energized upon the closing of the start switch 179. This starting relay, when energized, closes normally open contacts 173 in the power lines to the power equipment.

Also associated with the motor starting relay, is a pair of normally open contacts 197 which are connected across the contacts of the start switch and function as a holding circuit upon release of the start switch.

Also connectable between the control power leads, through a pair of normally closed contacts 199, a pair of normally open contacts 201 and a second pair of normally closed contacts 203, is an under-voltage relay 205 which controls a pair of normally open contacts 207 in one of the control power leads 181. This leaves all the remaining control circuits which control the actual handling of loads, dependent for power, upon the preliminary energization of this relay 205. This relay on the other hand, cannot be energized until the normally open contacts 201 in circuit therewith are closed.

Such contacts it is noted, are associated with the relay 61 in the separately excited field winding circuit of the motor, whereby only upon energization of this motor field can the associated relay become energized and permit energization of the under-voltage relay 205. The significance of this lies in the fact that should the motor lose its field, all the load control circuits become de-energized.

The one pair of normally closed contacts 203, it is noted, is associated with an overload relay 209 in the output circuit of the generator, while the other pair 199 is associated with the load sensitive relay 17 in the direct current hoist motor circuit, whereupon in the event either the generator or the motor are overloaded beyond a safe limit, the load control circuits will become de-energized through opening of the contacts associated with the under-voltage relay 205.

The two pairs of normally open contacts 167 in the brake circuit of the load motor, are associated with a brake relay 221 which is energizable from the control power leads through a circuit including the relay winding, either one of parallel connected pairs of normally open contacts 223, 225 respectively, which are in series with another pair of normally open contacts 227; or the brake relay can be energized through an alternative circuit from the relay winding including one of parallel connected pairs of normally open contacts 231, 233 respectively, which are in series with another pair of normally open contacts 235. Thus before the brake relay can be energized, a circuit through the relay must be completed by way of one of the aforementioned alternative paths.

The dynamic braking contacts 160 in the circuit across the load motor armature, are included in a dynamic braking relay 237 which is connectable between the control power leads through either of two parallel connected pairs of normally open contacts 239, 241 respectively. Thus energization of this dynamic braking relay, which would serve to open the normally closed contacts 160 thereof, can only occur on closing of either of the parallel connected pairs of contacts in circuit with this relay.

The normally open pairs of contacts 41 and 49, which determine rotation of the motor in the lift direction, are, as previously stated, controlled by relay 43 which determines the "up" direction of lift of the motor. This relay is energizable from the control power leads 181, 183 through a circuit including either of two pairs of normally open contacts 249, 251, respectively, a pair of normally closed contacts 253, and the relay winding.

In parallel with the "up" relay is a hoist control relay 255, which when energized, will effect closing of the contacts 91 to the separately excited field of the generator by way of the rectifier 89; also the normally open contacts 227 in the circuit of the brake relay 221; and also the normally open contacts 239 in the circuit of the dynamic braking relay 237.

Also connected in parallel with the "up" relay 43, is an auxiliary relay 257 which, when energized, will control the closing of the normally open contacts 31 in the circuit shunting the light load current limiting relay 19 in the circuit to the load motor. The last three mentioned relays, namely, the "up" relay 43, the hoist control relay 255 and the auxiliary relay 257, thus cannot be energized until one pair of the parallel connected normally open contacts 249 and 251 is closed.

The two pairs of normally open contacts 45 and 51 in the input leads to the motor armature and which determine the reverse rotation of the motor for lowering of loads, as previously stated, are controlled by the "down" relay 47. This relay is connectable for energization, between the control power leads, through either of two parallel connectable pairs of normally open contacts 259, 261 respectively, a pair of normally closed contacts 263 and the relay winding.

The normally closed contacts 263 in the "down" relay circuit are controlled by the "up" relay 43, whereas the normally closed contacts 253 in the "up" relay circuit are controlled by the "down" relay 47. Thus when the "up" relay is energized for a lifting operation of the hoist, it will open the circuit to the "down" relay and lock out this latter relay while the lifting operation is in process. Conversely, while a lowering operation is in process, the "up" relay cannot be energized.

In parallel with the "down" relay is a down control relay 265 corresponding in the lowering operation of a load, to the function of the hoist control relay 255 during a lift operation, in that it controls the closing of the normally open contacts 235 in the braking relay circuit, the closing of the normally open pair of contacts 241 which parallel the hoist control relay contacts 239 in the circuit of the dynamic braking relay 237, and the closing of the normally open contacts 93 paralleling the hoist control relay contacts 91 in the circuit to the separately excited field of the generator.

Each of these relays, 255, and 265, has an additional normally open pair of contacts 267, 269 respectively, in series with the normally open contacts 170 of the anti-plugging relay 169. An anti-plugging circuit is completed from control power lead 183 through parallel connected relays 43, 255, 257, the normally closed contacts 253 of relay 47, the normally open contacts 267 of relay 255 and the normally open contacts 170 of the anti-plugging relay 169. A similar anti-plugging circuit is completed from the control power lead 183 through parallel connected relays 47, 265, the normally closed contacts 263 of relay 265, and the normally open contacts 170 of the anti-plugging relay 169.

The controlling of the lifting and lowering of loads, is assigned to a pair of controllers 277, 279, the first for heavy load operation within the speed range from the base speed of the load motor to a lower speed of the order of 8% of base speed, while the other controller serves for light load operation within a speed range extending up to approximately 400% of base speed in the present system, overlapping to a certain extent the lower speed range covered by the heavy load operation.

Each of the controllers involves two sets of sequentially engageable switch contacts 281, 283 respectively, the one set for the control of lifting operations and the other set for the control of lowering operations, which of course requires a reverse rotation of the load motor.

Considering the heavy load controller, it has associated with it, a first speed determining relay 287. This relay is connectable in a circuit between the control power leads which circuit by-passes the controller contacts. Such circuit includes a normally closed pair of contacts 289, either of two parallel connected pairs of normally open contacts 291, 293 respectively, the relay winding and, in common with the brake relay circuit, the network of normally open contacts 223, 225, 227, 231, 233 and 235.

Nothing happens in connection with this relay 287, however, until the controller is operated to bridge its first pair of contacts 295. This closes a circuit through a heavy load hoist control relay 297 including a normally closed pair of interlock contacts 289, a second pair of normally closed contacts 299, the relay winding, and a main hoist switch 301.

Energization of the main load hoist control relay 297 directly closes one pair of the normally open contacts 225 in the hoist brake relay circuit, leaving the one normally open pair of contacts 227 yet to be closed before the brake relay circuit can be completed. Simultaneously, the main load hoist control relay 297 also closes a pair of contacts 249 in the circuit to the parallel connected "up" relay 43, the hoist control relay 255, and the auxiliary relay 257.

Also, the main load hoist control relay 297 closes one of the pairs of contacts 291 in the first speed relay circuit, to place this relay in condition to be energized simultaneously with the hoist brake relay 221, when the remaining pair of open contacts 227 common to the circuits of these relays is closed. This remaining pair of contacts is closed upon energization of the hoist control relay 255, whereupon the hoist brake relay will close its associated contacts 167 to energize the solenoid controlled brake of the motor, to hold the same in released condition.

The first speed relay 287, upon it becoming energized, will close the contacts 135 in the control winding circuit to thereby place minimum reference voltage across the control winding 97. This circuit may be traced from the negative side of the rectifier 99 through the portion 143 of resistor 139, the control winding, normally closed contacts 137, normally open contacts 135, resistor 133, resistor 123, resistor 117, and resistor 111. This results in minimum excitation to the seperately excited field of the generator, whereupon the motor armature will receive the minimum voltage from the generator.

Operating the controller to bridge the second pair of contacts 303, serves to energize a second speed relay 305 through a circuit including the normally closed pair of interlock contacts 289, the relay winding, and the now closed pairs of contacts 225 and 227, in common with the circut through the hoist brake relay. The resulting energization of the second speed relay serves to open its normally closed contacts 137 located in the control winding circuit and simultaneously therewith close its normally open contacts 129 to complete a circuit from the control winding through contacts 129, normally closed contacts 127, normally closed contacts 125, resistor 123, resistor 111, to thereby increase the voltage across the control winding, by the voltage drop through the resistor 133.

This results in an increase in the excitation to the generator field, with a resulting increase in the generated voltage applied to the load motor. The motor is now operating at a higher speed than the minimum speed determined by the first speed relay.

Closing of the third pair of contacts 307 of the controller, serves to energize the third speed relay 309 in a manner similar to the others by connecting it in parallel therewith. Energization of the third speed relay will open contacts 127 in the control winding circuit and at the same time, close normally open contacts 121 to further increase the voltage in the control winding circuits by an amount equal to the voltage drop across the resistor 123. As in the previous instances, the generator field excitation will be increased, resulting in an increase in generator voltage and a corresponding increase in the speed of the load motor.

Closing of the fourth pair of contacts 311 will energize the fourth speed relay 313, which in turn will open contacts 119 and close contacts 113 to further increase the voltage in the control winding circuit, by an amount equivalent to the voltage drop through the resistor 117, thus resulting in a further increase in speed of the motor.

Maximum speed of the motor for heavy loads, equivalent in this case to the base speed of the motor, is obtained by connecting the fifth speed relay 315 in parallel with the previous speed determining relays, through the bridging of a fifth pair of contacts 317 in the controller. Energization of this relay, places maximum voltage across the control winding, by opening contacts 115 and closing contacts 107. This enables the generator to apply rated voltage to the motor armature and cause the motor to run at base speed.

It may be noted at this point, the motor speed was controlled entirely through altering the voltage applied to the motor armature, from a value substantially less than rated voltage to its rated voltage, and that throughout this procedure, the resistors 67, 69 and 71 were shunted out of the motor field circuit.

Deceleration during lifting, is accomplished by a reversal of the procedure just described in connection with the operation of the controller, during which the controller may be reversely operated back to its "off" position, at which time, regenerative braking sets in, if the motor, at the moment is exceeding first speed. A significant thing happens, however, during the course of such deceleration, due to the presence of the anti-plugging relay circuit in the system. As previously indicated, the anti-plugging relay 169 is designed to open at a low voltage, which may be equivalent to that voltage applied to the motor from the generator at the first speed position of the controller. This means that the contacts associated with the anti-plugging relay will remain closed until such voltage is reached during regenerative braking.

It will be recalled in this connection, that the main hoist control relay 297 was instrumental in initially effecting energization of the hoist control relay 255 and the auxiliary relay 257 in parallel therewith, but now, due to the presence of the anti-plugging relay circuit, the hoist control relay and the auxiliary relay do not become de-energized upon the de-energization of the main hoist control relay, but will remain energized until the voltage generated by the motor, which is now acting as a generator, drops down to the aforementioned value at which the anti-plugging relay will open its contacts.

The significance of this lies in the fact that a sudden reversal of the controller will prevent application of reverse voltage across the motor armature and a consequent fast application of the spring actuated brake, and will effect a gradual deceleration of the motor armature and the load which is being lifted at the time and the mechanical brake will not be applied until the rotational speed of the motor has dropped to a value sufficiently low to permit mechanical braking without shock to the system.

In lowering the load, in the heavy load operating cycle, the second set of contacts 283 of the heavy load controller is employed. In this connection, it is noted that the speed control is exercised through the same relays as in lifting the load, and the first speed relay 287 bears the same relationship to the second set or lowering contacts as it does to the first set or hoisting contacts, in that its circuit is completed upon bridging the first pair of contacts 319 of the second set, which causes the energization of a heavy load lowering control relay 321 through a circuit including the normally closed interlocking contacts 289, a second pair of normally closed contacts 323 and the relay winding.

The normally closed contacts 323 are associated with the heavy load hoist control relay 297 in the lift circuit, which when energized, opens these normally closed contacts and locks out the lowering circuits.

Likewise, the heavy load lowering control relay 321 includes the normally closed contacts 299 in the circuit of the main hoist control relay, and consequently, when the lowering circuits are being utilized, the lifting circuits will be locked out by reason of the opening of the latter contacts.

When the heavy load lowering control relay 321 is energized, it not only locks out the lifting circuits as mentioned, but simultaneously therewith, closes the associated normally open contacts 293 in the circuit of the first speed relay. Also, the heavy load lowering control relay closes one pair of contacts 233 which are common to the hoist brake relay circuit and the circuit of the first speed relay. In addition, the relay 321 brings about energization of the "down" relay 47 and the down control relay 265 through closing of the contacts 259 in the circuits of these relays. The "down" relay, when energized, closes the contacts 45 and 51 which determine the lowering direction of rotation of the load motor.

The normally closed contacts 263 in the circuit to the "down" relay are opened when the "up" relay is energized, thus locking out the "down" relay circuit, and likewise, the normally closed contacts 253 in the circuit to the "up" relay, are opened when the "down" relay is energized, thus locking out the "up" relay circuit, as well as the circuits through the hoist control relay 255 and the auxiliary relay 257 which are in parallel with the "up" relay.

The down control relay 265 closes the contacts 235 to complete a circuit through the brake relay 221 and the first speed relay 287. It also, closes the normally open contacts 269 in series with the anti-plugging relay contacts 170 to provide an anti-plugging circuit for maintaining the down control relay energized until the motor speed, during regenerative braking, drops to a value comparable to the first speed, as determined by the first speed relay. Until the motor drops to this low speed therefore, the down control relay will maintain circuits through the hoist brake relay and the dynamic braking relay, whereby regenerative braking will continue until this lower speed is reached, and the spring actuated mechanical brake on the motor will be held out of engagement and released only when the motor speed has dropped to such low value.

Upon bridging the second pair of contacts 325 in the lowering set of the heavy load controller, a circuit is completed through the second speed relay 305, such circuit including the normally closed interlock contacts 289, the relay winding, and the contacts in common with the hoist brake relay circuit. This relay then will increase the lowering speed to the second stage, by increasing the current through the control winding of the magnetic amplifier. In like manner, the lowering speed may be successively increased through three additional stages, if desired, by sequentially bridging successive pairs of contacts 327, 329 and 331.

By reversing the operation of the controller, the lowering speed may be reduced, and brought to a stop, the mechanical brake then functioning to hold the motor and load at a standstill.

Now referring to the light load controller 279, it has associated with it, a first speed relay 351, which is connectable between the control power leads 181, 183 in a circuit including a pair of normally closed contacts 353, a parallel arrangement of two pairs of normally open contacts 355, 357, the relay winding, and the arrangement of normally open contacts 223, 225, 227, 231, 233, 235 which are common to the brake relay circuit and the circuits of the speed relays associated with the heavy load controller.

This first speed relay, however, does not become energized until a circuit is completed through the beforementioned normally open contacts, and this is accomplished through bridging of the first pair of contacts 359 in the set of contacts 281 employed for lifting operations. Closing of the first pair of contacts, closes a circuit through a light load hoist control relay 361 through the normally closed interlock contacts 353, a second pair of normally closed contacts 363, the relay winding, and the hoist limit switch 301.

This relay when thus energized, functions along the lines of the heavy load hoist control relay 297, in that it closes the normally open contacts 223, common to the brake relay circuit and the speed relay circuits; it closes the normally open contacts 251 to complete the circuit through the "up" relay 43, the hoist control relay 255, and the auxiliary relay 257; and it closes one of the pairs of normally open contacts 355 in the circuit of the first speed relay.

Thus, the light load hoist control relay 361 sets up the circuit through the brake relay to effect a withdrawal of the mechanical brake on the load motor; it sets up the circuit through the "up" relay which connects the load motor across the generator for lift rotation; it completes the circuit through the hoist control relay 255, which, among other things, completes the circuit to the generator separately excited field, and the magnetic amplifier; and further, in addition to completing the circuit through the dynamic braking relay, which serves to disconnect the dynamic braking circuit, it closes contacts 267 to complete the anti-plugging circuit.

The auxiliary relay 257 which is energized along with the "up" relay and the hoist control relay, as before, closes its contacts 31 to shunt the light load current limit relay 19.

Upon becoming energized, the first speed relay 351 in the light load hoisting cycle, closes the normally open contacts 131 in the control winding circuit, to cause current to flow through the control winding corresponding to the second speed relay of the heavy load hoisting cycle. Thus for light loads, the first speed will be comparable to the second speed of the heavy load lifting cycle, which is permissible in lifting lighter loads.

Upon closing of the second pair of contacts 365 in the light load hoisting cycle, a second speed relay 367 is thereby connected in parallel with the first speed relay. This second speed relay also operates on the magnetic amplifier by closing the normally open contacts 109 to cause maximum voltage on the control winding, which produces rated speed of the load motor and corresponds to the 5th or maximum speed in the heavy load lifting cycle.

To this extent, the lower end of the speed range for the light load lifting cycle, overlaps the higher end of the speed range for the heavy load lifting cycle.

Closing of the second pair of contacts also completes a circuit through a time delay relay 369, a pair of normally closed contacts 371, and those contacts common to the brake relay and speed relay circuits.

The time delay relay controls a pair of normally open contacts 373 in the circuit of a third speed relay 375 which is connected in parallel with the time delay relay, when said time delay relay contacts are closed. It accordingly sets up the third speed relay circuit to be closed upon bridging the third set of contacts 379.

The third speed relay when energized, among other things, opens the normally closed contacts which shunt the field resistor 67 in the circuit of the separately excited field of the load motor. The inclusion of this resistor in the field circuit, serves to weaken the field and bring about an increase in the speed of the load motor, over and above that resulting in the energization of the second speed relay.

The normally closed contacts 371 in the third speed relay circuit, are controlled by the light load current limit relay 19 of the motor circuit. By selecting the resistor 29 as to value, sufficient of the load current can be made to pass through the light load current limit relay 19 during overloads of the order of say 125% full load, to cause its contacts 371 to open.

When such an overload occurs, further increase in the lifting speed of the motor is undesirable. The time delay relay therefore is timed to give the light load current limit relay 19 an opportunity to sense the load condition on second speed, which is the base speed of the motor, before closing its contacts 373 in the circuit of the third speed relay 375. If an overload exists, the prior opening of the contacts 371 of the light load current limit relay will render the closing of the time delay contacts ineffective. During light load lifting, therefore, the maximum speed will be limited to the base speed of the motor in the event of an overload.

The shunting resistor 29, when connected in circuit, functions additionally to compensate for reversal in system efficiency due to direction of operation, causing less load current flow during lowering than during lifting, with a given hook load.

The fourth pair of controller contacts 381 are located in a circuit through a fourth speed relay 383, such circuit including the normally closed interlock contacts 353, a normally open pair of contacts 385 associated with the third speed relay 375, the relay winding, and a second pair of normally open contacts 387 controlled by the third speed relay and paralleling the normally closed contacts 371 of the light load current limit relay.

Being that the third speed relay is in an energized condition, the normally open pairs of contacts in the fourth speed relay circuit will now be closed, and cause the fourth speed relay to become energized. It in turn will open its normally closed contacts 83 which shunt the resistor 69 in the circuit of the motor field, thereby cutting this resistor into the circuit to further weaken the motor field and bring about increase in the speed of the motor.

Closing of the fifth pair of contacts 389 for light load lifting, completes a circuit through a fifth speed relay 391, which circuit includes the normally closed interlock contacts 353, a pair of normally open contacts 393 associated with the previously energized fourth speed relay, the relay winding, and the normally open but now closed contacts 387 of the third speed relay, such contacts as previously pointed out, being in parallel with the normally closed contacts 371 of the light load current limit relay 19.

The fifth speed relay when energized, will open contacts 85 which shunt the resistor 71 in the motor field circuit, thus including such resistor, which serves to further weaken the motor field and thus bring about an additional increase in the speed of the motor. At this point the load motor is running at maximum speed which may be of the order of 400% or more times its base speed.

By reversing the sequence of operations in the hoist cycle of the light load controller, the speed of the motor may be diminished and brought to a halt when the controller is adjusted to its "off" position.

For a lowering operation on light loads, the same speed relays are utilized, but in conjunction with the lowering set of contacts 283. The circuit through the first speed relay remains substantially unchanged except for the closing of normally open contacts 357 in lieu of contacts 355, and the closing of normally open contacts 231 and 235 in lieu of contacts 223 and 227. The two mentioned pairs of normally open contacts 357 and 231 are directly associated with a light load lowering control relay 395 connected in circuit between the control power leads, such circuit including the normally closed interlock contacts 353, a pair of normally closed contacts 397 and the relay winding. This relay 395 is energized by the bridging of the first pair of contacts 398.

The normally closed contacts 397 it will be noted, are associated with the light load hoist control relay 361 while the normally closed contacts 363 in the circuit of the light load hoist control relay 361 are associated with the light load lowering control relay 395. This establishes a lockout feature, whereby when the hoist circuits are being utilized, the lowering circuits will be locked out, and conversely, when the lowering circuits are being utilized, the lifting circuits will be locked out.

The light load lowering control relay 395 performs functions similar to the light load hoist control relay 361. It closes a pair of normally open contacts 231 in that portion of the system common to the brake relay circuit and the speed relay circuits; it closes a pair of contacts 261 in the circuit of the "down" relay 47 and the down control relay 265, the "down" relay in turn closing the contacts 45, 51 in the motor circuit to establish rotation in the lowering direction, while the down control relay in turn closes the contacts 235 to complete the circuit through the brake relay and partially complete the circuit through the first speed relay 351, which circuit is completed upon closing the normally open contacts 357 in said circuit, which contacts are also associated with the light load lowering control relay 395.

Thus energization of this latter relay, in terms of the hoist equipment, connects the motor for proper direction of rotation, withdraws the mechanical brake from the motor, opens the dynamic braking circuit, and establishes rotation of the motor at a minimum light load speed comparable to the second speed for heavy load operation.

In terms of the control circuits, the "down" relay 47 is energized and opens contacts 253 in the circuits of the hoist control relay 255, the "up" relay 43 and the auxiliary relay 257, to preclude energization of any of these relays.

The opening of the circuit to the auxiliary relay 257, leaves the shunt circuit around the light load current limit relay 19 open, thus exposing the light load current limit relay to full load current in the motor circuit during the lowering cycle.

Ordinarily, the loads will be sufficient to mechanically drive the motor during lowering. For very light loads, insufficient to mechanically drive the motor, the motor will be electrically driven and will accordingly function as a motor.

For loads, sufficiently heavy to mechanically drive the motor, the motor will then function as a generator in turn driving the direct current generator as a motor. This unit mechanically connected to the drive motor will function as an induction generator pumping the power generated into the main power system.

Bridging of the second pair of contacts 399 in the lowering cycle of the light load controller, closes a circuit through the second speed relay 367, as well as a circuit through the time delay relay 369 whose circuit includes the normally closed contacts 371 of the light load current relay 19 and the normally open contacts 387 of the third speed relay which contacts are in parallel with the normally closed contacts 371.

The time delay relay delays the closing of its associated normally open contacts 373 in the third speed relay circuit, for a time sufficient to permit the light load current limit relay 19 to respond to any overloads which may exist at the moment in the load motor circuit. Should such an overload exist, the light load current limit relay contacts 371 will open before the third speed relay contacts. Thus, further increase in speed of the motor above second speed will be precluded during a light load-lowering operation, should an overload current exist.

On the other hand, if no overload current exists, the time delayed contacts 373 will close and complete the circuit through the third speed relay except for the bridging of a third pair of contacts 401. This third speed relay will not only cut in resistance 67 to effect an increase in speed of the motor, but will at the same time, close the normally open contacts 385, 387 in the fourth speed relay circuit, to set up this circuit for operation when the fourth set of contacts 403 of the lowering set 283 is closed.

The resulting energization of the fourth speed relay will increase the speed of the load motor through inclusion of the resistor 69 in the field circuit. At the same time, the fourth speed relay will close the normally open contacts 393 in the circuit of the fifth speed relay 391 to set this relay up for operation when the controller is operated to bridge the last pair of contacts 405 of the lowering cycle. This fifth speed relay then will further increase the motor speed through inclusion of the resistor 71 in the motor field circuit.

Deceleration of the load being lowered is accomplished through reverse sequence of operation of the controller lowering contacts, until the "off" position is reached, when the motor and load may be held at a fixed position by the mechanical brake which, in the meantime, has been permitted to effect its braking function.

During a hoisting operation on light loads where motor speed is increased through the inclusion of resistors into the field circuit of the motor, the sudden inclusion of resistors would normally tend to produce a sharp increase in motor armature current, which would result in jerky operation of the hoist, not to mention the effect of the sudden changes in load produced thereby on the hoist equipment.

To alleviate this condition and bring about a smoother operation, the field accelerating relay 23 is employed. This relay as previously described, is a vibrating type relay, utilizing a double coil, the one coil 21 being connected in the motor armature circuit, while the other coil 73 is included in the field circuit of the motor.

This vibrating type relay controls a pair of contacts 407 which shunt the resistors 67, 69 and 71 in the field circuit of the load motor. The vibrating contacts alternately insert and remove such resistors from the field circuit as are being utilized, thereby causing the acceleration during hoisting to be gradual. During lowering of a load, the relay is rendered inoperative due to the fact that the windings thereof are in bucking relationship to one another.

During the lowering of a load, the rate of deceleration due to increased field strength during regenerative lowering, also causes excessive motor armature current, resulting in operation which may be somewhat jerky, and to alleviate this condition, the vibrating relay 27 is utilized.

This relay also employs two windings, one of which 25 as previously indicated, is connected in the motor armature circuit, while the other 409, is connected across the separately excited field circuit of the motor. This relay controls the vibration of the normally closed contacts 79 which shunt the resistor 65 in the field circuit of the motor. The vibration of these contacts during a lowering operation will serve to smooth out the rate of deceleration as the resistors which control field weakening are sequentially shunted out of the circuit. During hoisting, this relay becomes ineffective inasmuch as the windings of the relay will be bucking each other due to a reversal of the current in the motor circuit.

In converting the foregoing system to one embodying the features of the present invention, a bucking field winding 425 is incorporated into the generator on the field poles thereof, to develop a voltage in opposition to that derived from the regular field winding 39. However, while the regular field winding receives its excitation from the magnetic amplifier, the bucking field winding is connected across the output of the full wave rectifier 99 in series with an excitation control resistor 427, and thus its excitation is fixed depending upon the adjustment of the resistor, and is thus independent of the magnetic amplifier.

A circuit involving a generator and magnetic amplifier possesses regenerative characteristics, that is, a decrease in generator voltage causes the magnetic amplifier to increase field excitation and thereby tends to increase the generator voltage, and conversely, an increase in generator voltage causes the magnetic amplifier to decrease field excitation and thereby tends to decrease the generator voltage. This regenerative action makes it inherently difficult to operate over the lower region of the magnetization curve of the magnetic amplifier.

Bucking fields have previously been incorporated into generators for the purpose of extending the range of operation of a magnetic amplifier, but the use of such bucking windings merely enable an operator to lower the generator output voltage to but only a limited degree.

In the present invention, the bucking field is of such greater magnitude as to be capable, not only of overcoming that portion of the generator voltage attributable to residual magnetism in the pole pieces of the generator, but of actually reversing the generator voltage if and when the magnetic amplifier can be driven to operate in the lower region of its magnetization curve. This latter requirement can be met by adding to the negative ampere turns of the control winding, sufficient additional negative ampere turns, which do not trace their origin to the output of the generator, but are entirely independent thereof.

Specifically, this is accomplished by connecting a control or bias winding 429 across the output of an independent source of voltage such as the full wave rectifier 99, and in series with such winding, a voltage dropping resistor 431, if desired, and a potentiometer 433 for manual adjustment of the current through the bias winding, whereby to critically control the negative ampere turns supplied by this winding. Inasmuch as the current through this bias winding is independent of the generator voltage, the negative ampere turns added by this winding will not be affected by any regeneration through the magnetic amplifier. The significance of this lies in the fact that with the added control or bias winding functioning, operation of the magnetic amplifier can be driven down along its magnetization curve to the lower region thereof, where, due to the presence of the heavy bucking winding in the generator, the generator voltage may be lowered to zero and then reversed to build up a voltage of opposite polarity, which for the present invention need not be large, say of the order of 5 to 10 volts negative.

Figure 7:
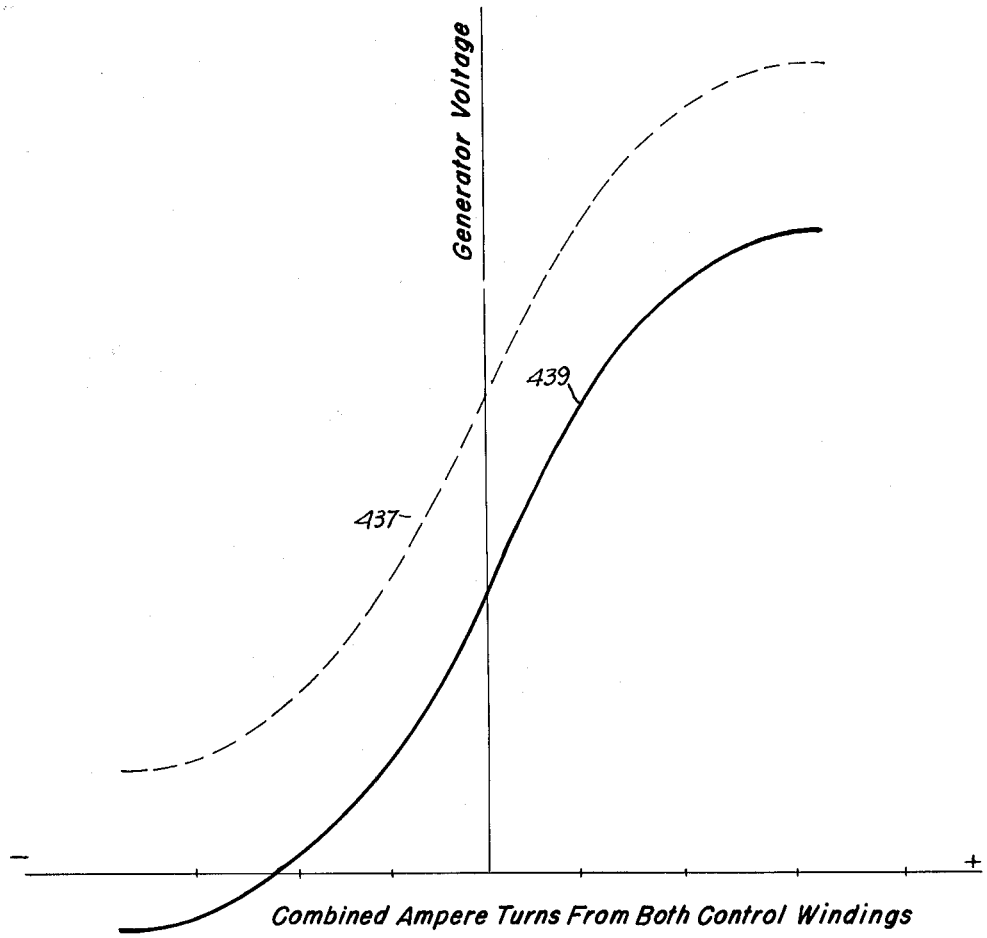
FIGURE 7 is a view depicting operating characteristics of the load float control of the present invention.
Figure 8:
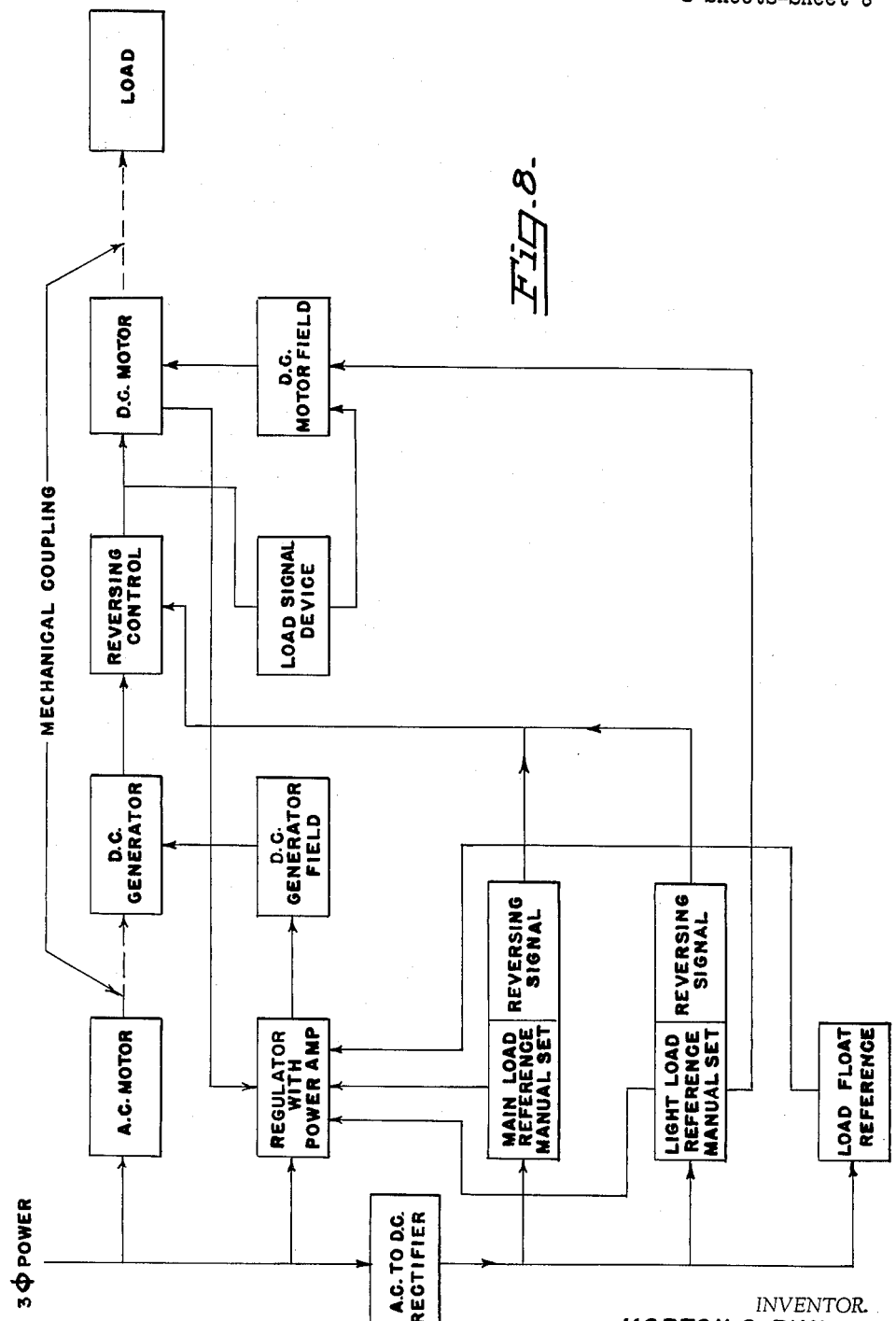
FIG. 8 is a simplified block diagram of the circuitry disclosed in FIGS. 1–6.

These results are depicted in the curves of FIG. 7, where the dotted curve 437 represents generator voltage with the additional control or bias winding 429 but without the heavy bucking field winding 425. The combination of the heavy bucking field winding 425 and the bias winding 429, serves to drop the generator voltage and cause its voltage to follow the solid line curve 439 which passes through the zero voltage axis and reverses polarity.

In terms of its application to the control of a hoist load, the negative ampere turns supplied by the bias winding may be adjusted to develop a torque in the hoist motor just sufficient to balance the load carried by the motor. Thus with power on the motor, the motor will suspend such load, while the motor itself is at a standstill, thus establishing a condition of equilibrium, though the motor is ready to move in one direction or the other with the slightest unbalance of such equilibrium condition, as can be brought about by the addition or subtraction of negative ampere turns, permitted by adjustment of the potentiometer 433 in the bias winding circuit.

For loads of sufficient weight to normally overcome friction of the motor and associated equipment, the generator will necessarily have to function at positive voltage to float such a load in equilibrium, as well as when raising or lowering the same.

When the load, however, is too light to overcome the friction of the hoist apparatus, as for example, when operating with an empty hook, such light load will remain suspended because of this, and to lower the same will require positive drive of the motor in the lowering direction. Under these conditions, application of sufficient additional negative ampere turns to reverse the generator voltage and thereby apply a negative voltage to the motor is called for.

The entire range of load conditions therefore, can be taken care of merely through manual adjustment of the potentiometer in the bias winding circuit, the operator being guided in this, merely by visual observation of the action of the load in response to adjustments as they are being made.

For the load control feature of the present invention to function in the multi-range hoist system described, necessitates maintaining the load control independent of the step by step control of such system previously described, with provision for inter-changeably connecting them in for operation when required.

With this in view, the two controllers 277 and 279 are coupled by a gang switch 445, adapted, when opened, to open the line connection to each controller, thus rendering inactive, both the heavy load and light load operations.

Associated with the heavy load range end of the gang switch, is a normally open contact 447 to be closed by such operation of the gang switch, to complete a circuit from the line 181, through normally closed contacts 289, a normally open push button switch 451, a relay 453, and either group of normally open contacts 223, 225, 227 or 231, 233, 235 to the other line 183.

This relay 453 controls a pair of normally open contacts 455 in the bias winding circuit. Thus the bias winding circuit which is normally open by reason of these contacts 455 is closed upon energization of the relay 453.

From a point intermediate the push button switch 451 and relay 453, a connection 457 is made to the lead to the heavy load hoist control relay 297, thus to shunt the push button switch across the low speed contact 295 in the heavy load range.

Upon depressing the push button switch 451, the system is set up for functioning in the lowest speed of the heavy load range, while at the same time, the bias winding circuit is set up for operation by the closing of the relay contacts 455. Thus, while the push button switch remains closed, the multi-range hoist system is converted to float control of the load in accordance with the present invention.

With this feature incorporated into the multi-range hoist system, either light or heavy loads may be rapidly, within the speed range provided, lowered to within close proximity of its position of rest, whereupon the system may be rapidly converted to load float control which then permits precision manipulation of the load until it finally reaches its rest position.

In this type of operation, the control system has been found to be self compensating, in that any change in load during lowering, as when one end of a load contacts the rest position in advance of the remainder of the load, will not upset the lowering movement of the motor, which will continue until the entire load has reached rest position.

The specific drive described is not limited in its application to hoists where the load is such as to normally tend to drive the motor. It is conceivable that the drive of the present invention might be utilized in controlling different types of loads, as for example, in the driving of a vehicle, in connection with which, the negative ampere turns might be adjusted to zero voltage, or to the point where the curve 439 crosses the horizontal axis.

When so adjusted, the motor will be at zero speed and thus determine the standstill condition of the vehicle, yet the vehicle will be ready to proceed in the forward or reverse direction, and with slow deliberate precision if desired, merely by controlled movement of the rheostat 43.

From the foregoing description, it will be apparent that the invention fulfills all the objects thereof and while specifically disclosed in connection with a multi-range hoist system, the invention is for reasons noted above, broadly applicable to other hoists and other types of loads, and is furthermore, subject to alteration and modification without departing from the underlying principles involved. Accordingly, I do not desire to be limited in my protection to the specific details illustrated and described except as may be necessitated by the appended claims.

I claim:

1. A hoist system comprising a hoist motor having a hoist mechanism drive-connected thereto; means for altering the speed of said hoist motor for heavy loads, within a predetermined low speed range; means for altering the speed of said hoist motor for light loads, within a predetermined speed range extending above said low speed range; means for rendering impotent, either of said speed altering means upon operation of the other; a load float control involving means for electrically balancing a load on said motor to immovably suspend such load, and means for altering said electrical load balancing means to selectively cause a lowering or lifting of such load; and means for shifting operation of said hoist motor from both said heavy load and light operations to said load float control.

2. A hoist system comprising a hoist motor having a hoist mechanism drive-connected thereto; means for altering the speed of said hoist motor for heavy loads, within a predetermined low speed range; means for altering the speed of said hoist motor for light loads, within a predetermined speed range extending above said low speed range; means for rendering impotent, either of said speed altering means upon operation of the other; a load float control involving means for electrically balancing a load on said motor to immovably suspend such load, and means for altering said electrical load balancing means to selectively cause a lowering or lifting of such load; and means for shifting operation of said hoist motor from both said heavy load and light operations to said load float control and for operation at a speed corresponding to the lower end of said low speed range.

3. A hoist system comprising a hoist motor having a hoist mechanism drive-connected thereto; means for altering the speed of said hoist motor for heavy loads, within a predetermined low speed range; means for altering the speed of said hoist motor for light loads, within a predetermined speed range extending above but overlapping said low speed range; means for rendering impotent, either of said speed altering means upon operation of the other; a load float control involving means for electrically balancing a load on said motor to immovably suspend such load, and means for altering said electrical load balancing means to selectively cause a lowering or lifting of such load; and means for shifting operation of said hoist motor from both said heavy load and light operations to said load float control and for operation at a speed corresponding to the lower end of said low speed range.

References Cited by the Examiner

UNITED STATES PATENTS

| | | | |
|---|---|---|---|
| 2,287,745 | 6/1942 | Morawetz | 318—145 |
| 2,476,883 | 7/1949 | Mahnke | 318—6 |
| 2,519,370 | 8/1950 | Herchenroeder | 318—145 |
| 2,519,339 | 8/1950 | Avery | 318—158 X |
| 2,519,379 | 8/1950 | King | 318—145 X |
| 2,607,908 | 8/1952 | Edwards et al. | 318—6 X |
| 2,708,256 | 5/1955 | Colt | 318—6 |
| 2,740,088 | 3/1956 | Roberts | 318—145 X |
| 2,785,359 | 3/1957 | King et al. | 318—145 X |
| 2,943,250 | 6/1960 | Fath | 318—145 X |
| 3,035,214 | 5/1962 | Kelling | 318—162 X |

MILTON O. HIRSHFIELD, *Primary Examiner.*